C. C. DE WITT.
SIGNAL LAMP SYSTEM FOR CARS.
APPLICATION FILED MAR. 8, 1915.
1,161,035.
Patented Nov. 23, 1915.
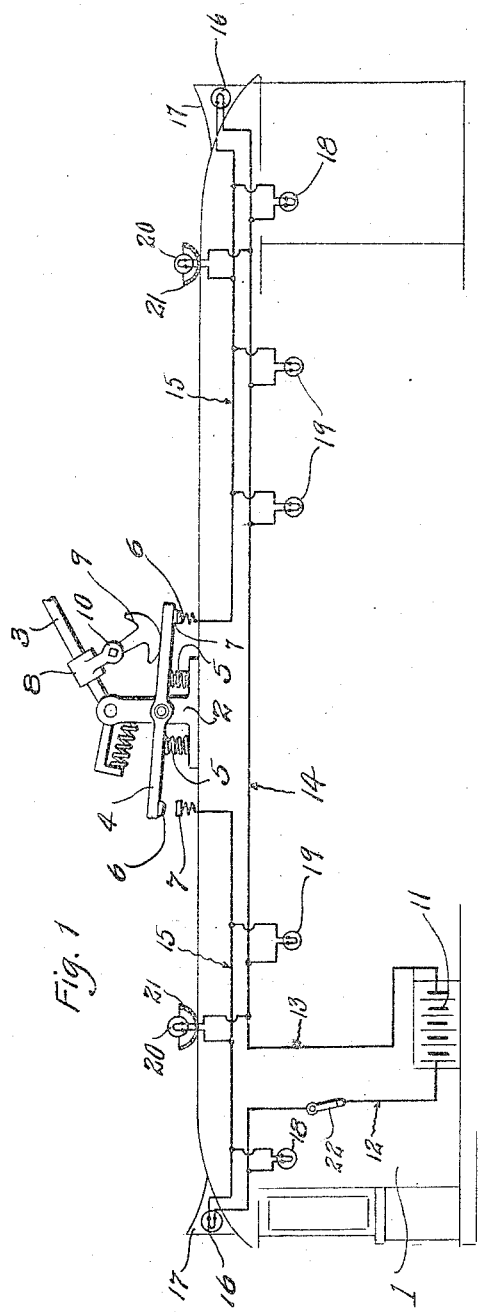
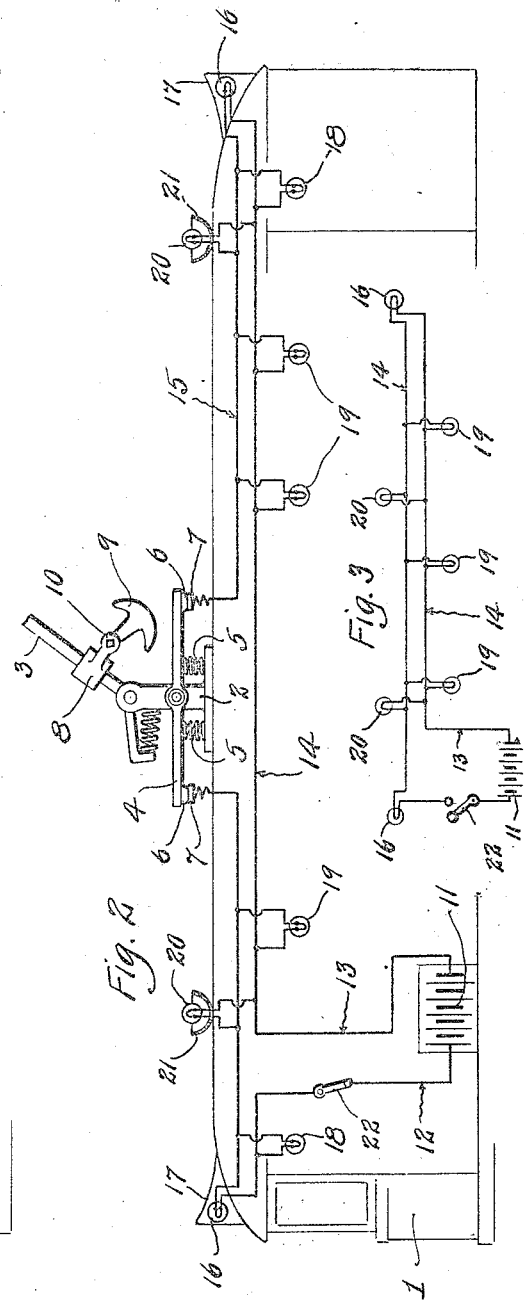
Witnesses
Inventor
Clinton C. DeWitt

United States Patent Office.

CLINTON C. DE WITT, OF SHREWSBURY, MISSOURI.

SIGNAL-LAMP SYSTEM FOR CARS.

1,161,035.

Specification of Letters Patent. Patented Nov. 23, 1915.

Application filed March 8, 1915. Serial No. 13,088.

*To all whom it may concern:*

Be it known that I, CLINTON C. DE WITT, a citizen of the United States, residing at Shrewsbury, St. Louis county, Missouri, have invented a certain new and useful Improvement in Signal-Lamp Systems for Cars, of which the following is a full, clear, and exact description, such as will enable others skilled in the art to which it appertains to make and use the same, reference being had to the accompanying drawings, forming part of this specification, in which—

Figure 1 is a diagrammatic view of a signal lamp system of my improved construction, the lamp circuit being shown open. Fig. 2 is a diagrammatic view of my improved signal lamp system with the lamp circuit closed. Fig. 3 is a diagrammatic view of a modified form of my improved lamp system.

My invention relates to new and useful improvements in signal lamp systems for street railway and interurban cars, the principal object of my invention being to provide a comparatively simple inexpensive signal lamp system which is effective at night and which is automatically thrown into operation whenever the trolley accidentally leaves the overhead wire, thus lighting up signal lamps to serve as protection against cars approaching from either direction and which might otherwise collide with the car having its trolley temporarily off the overhead wire.

Ordinarily the lights in a street or interurban car receive current from the trolley wire and in case the trolley leaves the wire while the car is running at night, said car is left in darkness until the trolley is replaced, and I propose to equip the car with a series of signal lamps located in a circuit which receives current from a storage battery carried upon the car and said circuit being provided with a switch which is automatically closed when the trolley leaves the overhead wire. Such a system temporarily lights up the car so that the same will be readily visible to the motormen of cars which may approach from either direction and by the location of proper warning lights, both the motorman and conductor are instantly warned that the trolley has left the overhead wire.

With the foregoing and other objects in view, my invention consists in certain novel features of construction and arrangement of parts, hereinafter more fully described and claimed.

Referring by numerals to the accompanying drawings, 1 designates the body of a car, on top of which is located the usual trolley stand 2, the same carrying the spring-actuated trolley pole 3. Pivotally mounted upon and insulated from the lower portion of the trolley stand is a horizontally disposed plate 4, the same being normally held in horizontal position by compression springs 5 which are located beneath said plate at equal distance from the pivot point thereof. Positioned on the ends of this plate 4 are contacts 6 which are adapted to engage spring-pressed contacts 7 which latter are fixed at suitable points on the top of the car. Fixed to and insulated from the lower portion of the trolley pole 3 is the upper end of an arm 8, the lower end of which carries a curved shoe 9 which is adapted to bear on top of plate 4 and located in this arm is a hinge point 10, the same being normally rigid by means of a set-screw or bolt which passes through the overlapping parts of the arm.

Located at a convenient point within the car is a storage battery 11 and leading therefrom are conductors 12 and 13. Located in the upper portion of the car are conductors 14 and 15, the inner ends of which latter are connected to the spring-pressed contacts 7. The outer ends of conductors 14 and 15 are connected to signal lamps 16, the same being preferably colored red and located in reflectors 17, which latter are positioned preferably on top of the car hoods.

Signal lamps 18, preferably red, are located beneath the car hoods at points where they may be readily observed by the motorman and conductor, said lamps being connected to conductors 14 and 15. Located at various points within the car is a series of lamps 19, either white or colored, the same being connected to conductors 14 and 15. Located on top of the car near its ends are lamps 20, the same being arranged in suitable reflectors 21 which are arranged to throw the rays from the inclosed lamps upwardly, and said lamps are connected to conductors 14 and 15. Located in conductor 12 is a suitable switch 22. Under normal conditions, or while the trolley is on the overhead wire, arm 10 occupies a position so that shoe 9 bears downward upon one end of plate 4, thereby elevating the opposite end so as to break contact between the pair of the contact plates 6 and 7, and thus the circuit in which the signal lamps and the battery are located is open. Under such conditions, the ordinary lamps of the car which receive current from the overhead wire, are lighted. In case the trolley leaves the overhead wire, it will be swung upward into a substantially vertical position as shown in Fig. 2, thereby permitting plate 4 to assume a horizontal position due to equal pressure exerted by springs 5, thus closing the pairs of contacts 6 and 7, and consequently closing the circuit in which the signal lamps and storage batterys are located. All of the lamps in this circuit will be immediately lighted and in addition to warning the motorman and conductor that the trolley has left the overhead wire, said signal lamps will light up both ends and the interior of the car so that the same will be plainly visible to the motorman of the car on the same track and approaching from either direction. The rays of lamps 20 will be thrown upward by the reflectors 21, thus showing the position of the overhead wire while the conductor replaces the trolley on said wire.

The shoe 9 is curved in order that it will maintain bearing on top of the plate while the car is rounding curves in which case the trolley swings laterally with respect to the length of the car.

The joint in the arm 10 permits the lower portion thereof to be elevated and connected to the trolley pole in case the latter is drawn downward onto the roof of the car as is the case when the cars are shipped from one point to another, or where they are stored in barns having comparatively low ceilings.

A signal system of my improved construction is comparatively simple, is applicable for all classes of trolley cars; is automatically thrown into action when the trolley leaves the overhead wire, and will be effective in preventing collisions due to a car being left dark when its trolley leaves the overhead wire.

In the modified form of the system illustrated in Fig. 3 the automatically operating contact which is associated with the trolley stand is dispensed with and the circuit is adapted to be closed by the manually operable push bottom in contact 22 which is located in the motorman's cab or upon the platform occupied by the conductor.

It will be readily understood that minor changes in the size, form and construction of the various parts of my improved system can be made and substituted for those herein shown and described, without departing from the spirit of my invention, the scope of which is set forth in the appended claims.

I claim:

1. The combination with a trolley car, of an electric circuit, a source of electrical energy for said circuit, a series of signal lamps in said circuit and located on the car, a normally closed switch in said circuit, and means on the trolley pole of the car for normally holding said switch in open position.

2. The combination with a trolley car, of an electric circuit, a source of electrical energy for said circuit, a series of signal lamps in said circuit and located on the car, a normally closed switch in said circuit, means on the trolley pole of the car for normally holding said switch in open position, and means for instantly closing said switch when the holding means is disengaged therefrom.

3. The combination with a trolley car and overhead wire, of an electric circuit on said car, a source of electrical energy connected to said circuit, signal lamps located in said circuit and arranged at both ends of the car, a series of lamps connected to said circuit and located within the car, a switch located in said circuit, and means carried by the trolley for engaging the switch to hold the same open when the trolley is on the overhead wire.

4. The combination with a trolley car and overhead wire, of an electric circuit on said car, a source of electrical energy connected to said circuit, signal lamps located in said circuit and arranged at both ends of the car, a series of lamps connected to said circuit and located within the car, a switch located in said circuit, means carried by the trolley for engaging the switch to hold the same open when the trolley is on the overhead wire, and means for closing said switch when the trolley leaves the wire and said switch holding means is elevated.

In testimony whereof I hereunto affix my signature in the presence of two witnesses, this 1st day of March, 1915.

CLINTON C. DE WITT.

Witnesses:
M. P. SMITH,
CHARLES E. HARRIS.